[11] 3,575,488

[72] Inventors Edward A. Ohm
Holmdel;
Ralph F. Tramburulo, Red Bank, N.J.
[21] Appl. No. 858,708
[22] Filed Sept. 17, 1969
[45] Patented Apr. 20, 1971
[73] Assignee Bell Telephone Laboratories, Incorporated
Murray Hill, N.J.

[54] SIMPLIFIED TWO-COORDINATE ELECTRO-OPTIC PRISM DEFLECTOR
3 Claims, 3 Drawing Figs.
[52] U.S. Cl.................................................. 350/150,
250/199, 350/157, 350/160
[51] Int. Cl..................................................... G02f 3/00
[50] Field of Search............................................ 350/147,
150, 157, 160, (Dig.2 D.L.D.); 250/199, (Sci. L.B.)

[56] References Cited
UNITED STATES PATENTS
3,439,975   4/1969   Smith........................... 350/150

*Primary Examiner*—David Schonberg
*Assistant Examiner*—Paul R. Miller
*Attorneys*—R. J. Guenther and Arthur J. Torsiglieri ABSTRACT: There is disclosed an arrangement of two-coordinate deflectors without the 90° polarization rotator between the stages that was previously thought to be essential. This reduction in the number of optical parts is achieved by mutually rotating only the inclined prism interfaces in the successive stages, while maintaining the crystalline axis orientations and electrode orientations the same in the two stages. The new deflector is easier to align and scatters less light than prior prism deflectors; and it will be useful in multiple-pass light deflectors and optical time-division multiplex communication systems.

PATENTED APR 20 1971 3,575,488

INVENTORS E. A. OHM
R. F. TRAMBARULO
BY
Wilford L. Wisner
ATTORNEY

SIMPLIFIED TWO-COORDINATE ELECTRO-OPTIC PRISM DEFLECTOR

CROSS-REFERENCE TO RELATED APPLICATION

This application is filed concurrently with our related application Ser. No. 858,705, assigned to assignee hereof.

BACKGROUND OF THE INVENTION

This invention relates to electro-optic light beam deflectors of the type employing compound electro-optic prisms with inclined interfaces.

All of the prior electro-optic light beam deflectors employing compound electro-optic prisms require a 90° polarization rotator between two stages which deflect in orthogonal coordinates. This 90° polarization rotator causes additional optical absorption and scattering and complicates the alignment of the complete deflection apparatus.

SUMMARY OF THE INVENTION

We have recognized that the 90° polarization rotator is not basic to the compound electro-optic prism deflector and can be eliminated by discarding the prior art convention of mutually rotating the entire assemblies of the respective stages by 90° and, instead, mutually rotating only the inclined prism interfaces in the successive stages while maintaining the crystalline-axis orientations and electrode orientations the same in the two stages. The beam is deflected in the direction of the greatest mass of "slow" material, as in prior compound electro-optic prism deflectors.

BRIEF DESCRIPTION OF THE DRAWING

Further features and advantages of our invention will become apparent from the following detailed description, taken together with the drawing, in which.

DESCRIPTION OF THE ILLUSTRATIVE EMBODIMENT

Figure 1:
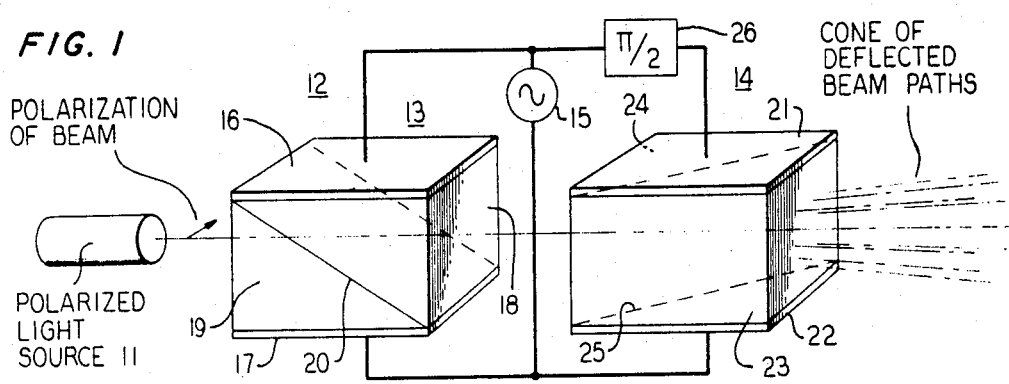
FIG. 1 is a partially pictorial and partially schematic illustration of an illustrative embodiment of our invention.

In the embodiment of FIG. 1, it is illustratively desired to deflect a horizontally polarized light beam from a source 11 in two orthogonal coordinates with a circular scan. It should be understood that this mode of operation is merely illustrative, since it is the mode of operation preferred when the deflection apparatus 12 is inserted between opposed reflectors of an interferometer in order to provide multiple-pass light deflection. Such deflection is useful for multiplying the deflection angles in an optical time-division multiplex communication system of the type disclosed in the copending patent application of Messrs. S. J. Buchsbaum and R. Kompfner, Ser. No. 631,301, filed Apr. 17, 1967, and assigned to the assignee hereof now U. S. Pat. No. 3,506,834. The deflection apparatus 12 could be employed in any two-coordinate light beam deflection, including that required in random access optical memories.

The compound electro-optic prism deflection apparatus 12 includes the vertical deflection stage 13 and the horizontal deflection stage 14, illustratively driven in phase quadrature from a source 15 of sinusoidal driving voltage of magnitude appropriate for the electro-optic material employed.

The vertical deflection stage 13 includes the electrodes 16 and 17 on top and bottom surfaces of the compound electro-optic prism and further includes the prism elements 18 and 19 which fill the space between electrodes 16 and 17 and have an inclined interface 20 which slopes from the electrode 16 to the electrode 17 in the direction of the light propagation. The normal to this interface lies in the vertical $y'-z$ plane. It will be noted that the plane of this interface is parallel to the polarization of the light passing therethrough for the specific case in which the electro-optic material in both prism elements 18 and 19 is potassium dihydrogen phosphate (KDP).

The horizontal deflection stage 14 includes the top and bottom electrodes 21 and 22, respectively, and the compound electro-optic prism composed of prism elements 23 and 24 (in back), respectively. The prism elements 23 and 24 fill the space between electrodes 21 and 22 and have an inclined prism interface 25 running from the near left-hand corner to the far right-hand corner in the direction of light beam propagation therethrough. The normal to this interface lies in the horizontal plane, which can be called either the $x'-y'$ plane or the $x-y$ plane. It will be noted that this prism interface 25 is orthogonal to the plane of the electrodes 21 and 22 and, for the specific case in which prism elements 23 and 24 are KDP, is oblique to the polarization of the light beam passing therethrough. The polarization of the light in both deflecting stages 13 and 14 is horizontal; and no 90° polarization rotator is employed between the stages 13 and 14.

For the illustrative case of circular scan deflection, the deflection voltage source 15 is connected directly between electrodes 16 and 17 to stage 13 and is connected between electrodes 21 and 22 of stage 14 through a 90° phase shifter 26.

Figure 2:
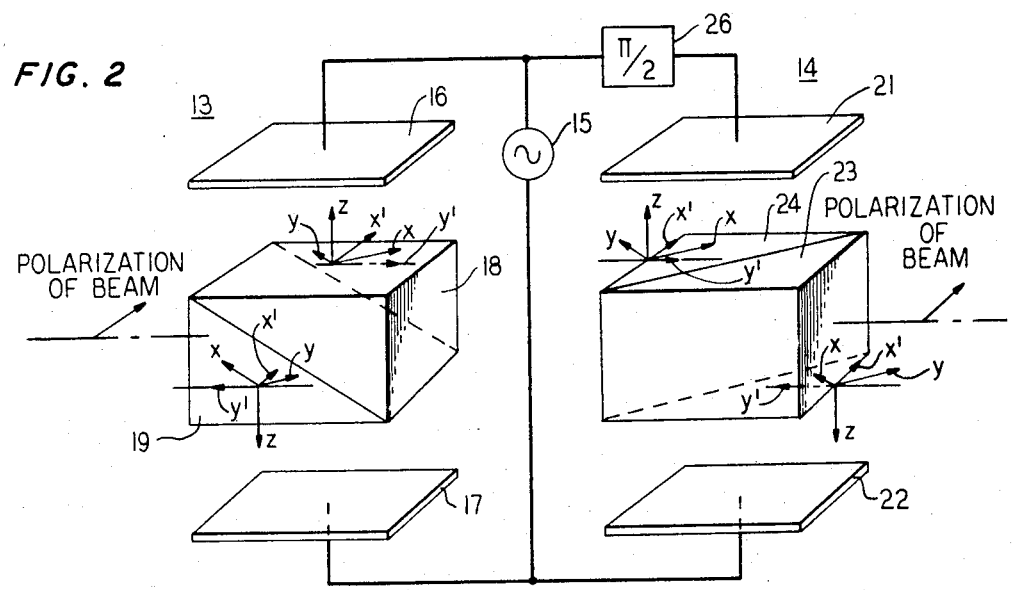
FIG. 2 is a modification of the essential portions of FIG. 1 showing an exploded view of the relationships of the compound electro-optic prisms and electrodes.

The crystalline axis orientation of the electro-optic prism elements in stages 13 and 14 is more readily illustrated in the exploded view of FIG. 2, to which reference is now made. In stage 13 the prism element 18 has its $z$-axis (optic axis) oriented in the vertical direction. For the purpose of defining the response of the index ellipsoid to an applied electric field we will consider the positive sense of its orientation, the 001 direction, to be upward, whereas the $x$-axis positive orientation, the 100 direction, is toward the right rear at 45° and the $y$-axis positive orientation, the 010 direction, is toward the left rear at 45° with respect to the light propagation direction. The prism element 19 has the opposed sense of positive orientation of the $z$-axis, that is, downward, whereas the positive sense of its $x$-axis is aligned with the positive sense of the $y$-axis in element 18, and the positive sense of its $y$-axis is aligned with the positive sense of the $x$-axis in element 18. For the more general case of electro-optic materials, the relative orientation of the prism elements can be obtained by considering that, when a uniform field is applied across the compound prism, both prism elements should provide relatively slow passage of the light beam toward the same edge of the light beam, top or bottom, and relatively fast passage of the light beam toward the opposite edge. Then the two prism elements yield an additive effect upon the deflection of the light beam.

In stage 14 the positive sense of the $z$-axis of the prism element 23 is oriented, following the convention established for stage 13, in the downward sense and the positive sense of its $y$-axis is oriented at 45° to the direction of beam propagation in the sense toward the right rear, the positive sense of its $x$-axis being oriented toward the left rear. In the prism element 24 the positive sense of the $z$-axis is oriented upward, the positive sense of the $x$-axis toward the right rear and the positive sense of the $y$-axis toward the left rear. It will be noted that the prism elements 18 and 24 have identical orientations of all three crystalline axes and, indeed, can be fashioned from a single piece of electro-optic material, since no polarization rotator is required therebetween. Likewise, the prism elements 19 and 23 have identical crystalline axis orientations; but they are separated from each other by prism elements 18 and 24.

In the operation of the embodiment of FIG. 1 stage 13 will produce a vertical deflection in a direct relation to the magnitude of drive voltage applied between electrodes 16 and 17, as in prior electro-optic prism deflectors. We will show that in conjunction with this vertical deflection the horizontal deflection stage 14 will operate upon the same polarization of the coherent light beam to produce a horizontal deflection in a direct relation to the magnitude of the drive voltage applied between the electrodes 21 and 22, which are parallel to electrodes 16 and 17.

Figure 3:
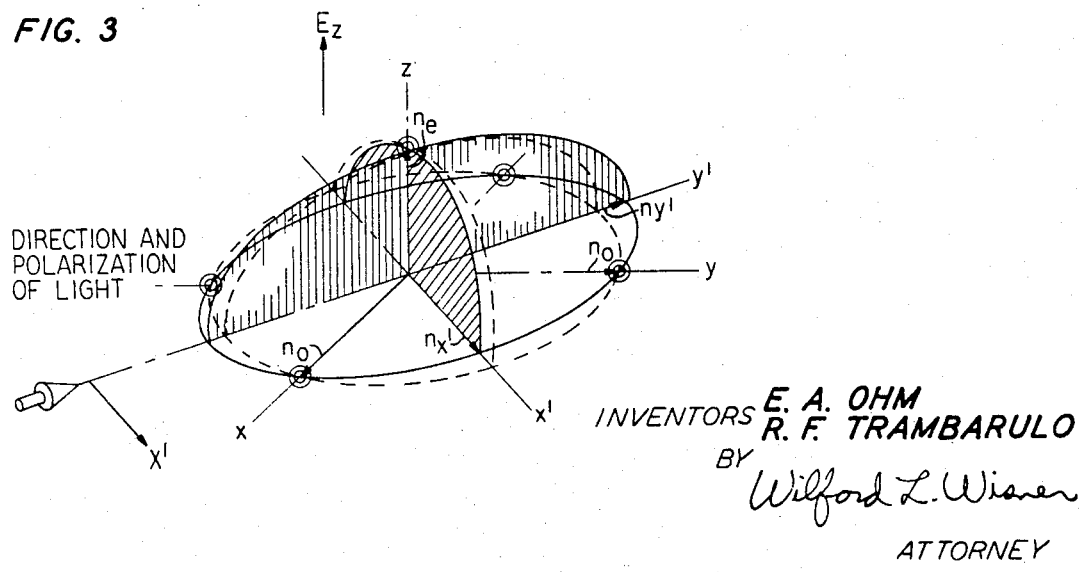
FIG. 3 shows a pertinent diagram of the index ellipsoid for the electro-optic material employed in the prisms.

We will now give a detailed explanation of the deflection in the two stages for the specific case of KDP, for which the index ellipsoid diagram in FIG. 3 is pertinent.

Beam deflection in an electro-optic material is achieved by causing a linear change in velocity across the face of the beam, where the change in velocity due to an applied electric field, for any beam direction, or polarization, is governed by the refractive index ellipsoid. For KDP, the ellipsoid equation is $$1 = \frac{X^2}{n_o^2} + \frac{Y^2}{n_o^2} + \frac{Z^2}{n_e^2} + 2r_{41}E_xYZ + 2r_{41}E_yZX + 2r_{63}E_zXY \quad (1)$$

where $X$, $Y$, and $Z$ are the components of refractive index in the [100], [010], and [001] directions in the crystal, taken as the $x$, $y$ and $z$ directions respectively, $n_o$ is the refractive index in the $x$ and $y$ directions, $n_e$ is the refractive index in the $z$ direction, $r_{63}$ and $r_{41}$ are the electro-optic coefficients, and $E_x$, $E_y$, $E_z$ are the components of electric field in the $x$, $y$, and $z$ directions. The positive sense of each field is toward the point of more positive potential.

In the absence of an electric field, the last three terms of Equation (1) are zero. The ellipsoid then has a circular cross section in the $x$–$y$ plane and is shorter in the $z$ direction, i.e., it is shaped like a door knob, as indicated by the dotted lines in FIG. 3. When an electric field $E_z$ is applied in the positive $z$ direction, the ellipsoid is elongated along the $y'$ axis (at 45° to the $y$-axis and compressed along the $x'$ axis (at 45° to the $x$-axis as shown by the solid lines in FIG. 3. There is no change in the ellipsoid along the $z$-axis. Here the shape is very nearly that of the initial door knob. Thus the change in the ellipsoidal surface due to the electric field is geometrically simple, and the electro-optic effects can be readily explained via the new ellipsoid which is shown in FIG. 3.

In all cases considered here, the beam is propagated along a principal axis which remains fixed in direction; this is the $y'$ direction in FIG. 3. As a result, the beam's polarization can be resolved into components along the other principal axes, and the velocity of each component is simply the velocity of light in free space divided by the refractive index in the direction of polarization.

As noted previously, the effect of $+E_z$ on the initial ellipsoid is to perturb the circular cross section in the $x$–$y$ plane into an ellipse as indicated in FIG. 3. The principal axes of the ellipse are along the $x'$ and $y'$ axes which are rotated 45° from the $x$ and $y$ axes. The index $n_{x'}$ is less than its zero-field value of $n_0$, and as a result, light propagated in the $y'$ direction, with polarization $x'$, is speeded up. For negative $E_z$, the process is reversed and the light is slowed down. From (1) it can be shown that $$n_{x'} = n_0/\sqrt{1+n_0^2 r_{63}E_z} \quad (2)$$

For a typically strong electric field of $E_z=3\times10^6$ volts/meter (air breakdown), $n_0^2 r_{63}E_z=3.6\times10^{-5}$ which is $\ll 1$. Thus (2) can be written $$n_{x'} = n_0 - \frac{1}{2}n_0^3 r_{63}E_z \quad (3)$$

where the second term on the right has a value of $2.7\times10^5$. Since there is no change in $n_e$ along the $z$-axis, -axis, the vertical component of polarization of the input beam is not affected. There are also no changes in $n_0$ in the $x$ and $y$ directions, as indicated in FIG. 3 by the encircled dots.

For KDP, the electro-optic effects diagrammed in FIG. 3 yields the greatest deflection sensitivity, and provides the basic means for deflection in the compound prism deflector.

It should be noted that the opposed $z$-axis orientations, the 001 directions, of the prism elements in each of the deflection stages produce a linear change in propagation speed across the face of the light beam, provided the electric field is uniform throughout that deflection state. For a positive potential applied to the upper electrode 16 an upward deflection occurs by virtue of the longer length of "slow" material at the top of the beam and the longer length of "fast" material at the bottom. The crystal, polarization and electric field directions are consistent with FIG. 3.

To obtain horizontal deflection, the crystal, polarization and field directions for stage 14 are again consistent with FIG. 3, except that the vertical planar interface of the two prisms must be inclined to cut obliquely across the face of the beam. For a field applied with the positive potential at the upper electrode 21, the greatest mass of "slow" material will be on the left; and the greatest mass of "fast" material will be on the right. There will again be obtained a linear change in speed across the face of the beam, this time in the horizontal direction.

Note that the beam polarization is always perpendicular to a $z$ crystalline axis; and the electric field is always applied along a $z$ crystalline axis, both of which conditions are necessary for maximum deflection sensitivity in KDP.

An analysis of the power requirements of our prism deflector is as follows: In the prism deflector, the electric field is uniform, and the drive voltage, $$V_{prism}, \text{ is: } V_{prism}=2R_0E_z \quad (4)$$

The capacitance, $C_{prism}$, energy stored, $W_{prism}$, and power dissipated, $P_{prism}$ are those of a parallel plate capacitor:

$$C_{prism} = \frac{\epsilon_0 \epsilon_r \text{ Area}}{\text{Gap}} = \frac{\epsilon_0 \epsilon_{||}(2R_0)L}{(2R_0)} = \epsilon_0 \epsilon_{||} L \quad (5)$$

$$W_{prism} = \frac{1}{2}CV^2 = \frac{1}{2}\epsilon_0\epsilon_{||}L(2R_0E_z)^2$$

$$P_{prism} = \frac{1}{2}\omega\epsilon_0\epsilon_{||}\tan\delta_{||}L(2R_0E_z)^2 \quad (6)$$

Awhere $(\epsilon_0\epsilon_{||})$ and $\tan\delta_{||}$ are the dielectric constant and loss tangent parallel to the optic axis, $L$ is the length of the deflector, and $\omega$ is $2\pi$ times the drive frequency. The equivalent circuit for the deflector is the capacity, $C_{prism}$, shunted y a resistance, $R_{prism}$. From Equations (5) and (6), and $R=V^2/2P$, $$R_{prism} = \frac{1}{\omega C_{prism}\tan\delta_{||}} = \frac{1}{\omega\epsilon_0\epsilon_{||}\tan\delta_{||}L} \quad (7)$$

We claim:

1. Apparatus for deflecting the propagation direction of an incident polarized electromagnetic wave energy beam, said apparatus being of the type comprising first and second compound electro-optic deflection stages, each of said stages including two triangular electro-optic prism elements having like crystalline axes mutually opposed and a pair of electrodes disposed to apply an electric field along said opposed axes, the two prism elements forming an interface inclined to the direction of propagation, said apparatus being characterized in that the pairs of electrodes of said first and second stages are mutually parallel, and the inclined interfaces of said first and second stages have normals lying in mutually orthogonal planes including the direction of propagation.

2. Apparatus according to claim 1 in which the first and second deflection stages are optically coupled to provide the same polarization of the beam in both of said stages.

3. Apparatus according to claim 2 in which the second prism element of the first stage and the first prism element of the second stage in the order of light passage therethrough have like crystalline-axis orientations.